United States Patent
Hallock et al.

(10) Patent No.: US 10,812,198 B2
(45) Date of Patent: Oct. 20, 2020

(54) SYSTEMS AND METHODS FOR ELECTROMAGNETIC SHIELDING AND ISOLATION DURING OBJECT IDENTIFICATION

(71) Applicant: Kindred Systems Inc., San Francisco, CA (US)

(72) Inventors: David Gabriel Hallock, San Francisco, CA (US); Bryan Whittington, San Francisco, CA (US)

(73) Assignee: Kindred Systems Inc., San Francisco, CA (US)

(*) Notice: Subject to any disclaimer, the term of this patent is extended or adjusted under 35 U.S.C. 154(b) by 0 days.

(21) Appl. No.: 16/685,399

(22) Filed: Nov. 15, 2019

(65) Prior Publication Data

US 2020/0169330 A1     May 28, 2020

Related U.S. Application Data

(60) Provisional application No. 62/772,458, filed on Nov. 28, 2018.

(51) Int. Cl.
| | |
|---|---|
| *H04W 4/80* | (2018.01) |
| *H04W 24/00* | (2009.01) |
| *G06K 7/10* | (2006.01) |
| *H04B 15/02* | (2006.01) |
| *H04B 17/30* | (2015.01) |
| *H04B 15/00* | (2006.01) |
| *H04B 5/00* | (2006.01) |
| *H04B 17/318* | (2015.01) |

(52) U.S. Cl.
CPC .......... *H04B 15/00* (2013.01); *H04B 5/0062* (2013.01); *H04B 17/318* (2015.01)

(58) Field of Classification Search
CPC .... G06K 7/0095; G06K 7/00; G06K 7/10019; G06K 7/10; H04W 4/80; H04W 24/00; H04W 24/02
See application file for complete search history.

(56) References Cited

U.S. PATENT DOCUMENTS

| | | | | |
|---|---|---|---|---|
| 6,104,291 | A * | 8/2000 | Beauvillier | G06K 7/0095 |
| | | | | 340/572.1 |
| 7,336,167 | B2 * | 2/2008 | Olsen, III | B65B 11/045 |
| | | | | 340/10.1 |
| 7,859,408 | B2 * | 12/2010 | Tuttle | G01S 7/024 |
| | | | | 340/572.1 |
| 2010/0102969 | A1 * | 4/2010 | Svalesen | G06K 17/0022 |
| | | | | 340/572.8 |
| 2012/0037696 | A1 * | 2/2012 | Lavi | G06K 19/07716 |
| | | | | 235/375 |
| 2013/0342321 | A1 * | 12/2013 | Zogg | G06K 7/01 |
| | | | | 340/10.1 |

* cited by examiner

*Primary Examiner* — Blane J Jackson
(74) *Attorney, Agent, or Firm* — Seed Intellectual Property Law Group LLP (57) ABSTRACT

One or more embodiments of the present disclosure relate generally to the field of robotic gripping systems, and in particular to electromagnetic shielding of Radio Frequency Identification (RFID) devices in order to prevent unwanted wireless exchange of data between RFID tags and remote transceivers, such as a RFID readers. In one or more exemplary embodiments, the shielding is utilized within a sort station or pick-and-place environment where a robotic gripper is operating.

19 Claims, 11 Drawing Sheets

SYSTEMS AND METHODS FOR ELECTROMAGNETIC SHIELDING AND ISOLATION DURING OBJECT IDENTIFICATION

CROSS-REFERENCE TO RELATED APPLICATION

This application is related to, and claims benefit of and priority from Provisional Application No. 62/772,458, filed Nov. 28, 2018, the complete subject matter of which is hereby incorporated herein by reference in its entirety.

BACKGROUND

Technical Field

The present disclosure relates generally to the field of robotic gripping systems, and in particular to electromagnetic shielding of Radio Frequency Identification (RFID) devices in order to prevent unwanted wireless exchange of data between RFID tags and remote transceivers, such as a RFID readers.

Description of Related Art

It is well known that electronic signals within electronic devices emit electromagnetic waves, and energy from these devices can cause electromagnetic interference (EMI) in other electric signals within the surrounding environment. In the case of RFID, RFID scanning technology relies on bi-directional wireless transmission between the RFID reader and the RFID device, such as a tag or transponder. Because of this use of wireless transmission, there is typically an inherent risk of interference between the RFID reader and tag, and other systems and equipment that may be in the same environment that are emitting electromagnetic waves.

Interference can prevent correct data from being transmitted and received by RFID devices, and interference can result in signals emitted from a RFID tag being interpreted incorrectly by a RFID reader due to cross-interference from other wireless signals in the environment, or from signals of other tags or devices that are not of interest.

Specifically, in a robotic pick-and-place environment where there may be numerous objects, each having a unique RFID tag, as well as potentially multiple RFID readers located in the environment, the potential for interference increases dramatically. The interference can lead to incorrect and/or delayed object selection, and can require manual human intervention and system downtime in order to rectify an incorrect or delayed object selection.

Conventional RFID shielding requires bulky and rigid hardware to be placed around the devices causing the EMI, or around a RFID device. Such hardware is not suitable for supply chain environments, where non-rigid packages, such as polybags, and the like, are utilized. For example, polybags can have a significant cost advantages; they use less material than other packaging and shipping supplies, such as cardboard boxes or cartons, and they often provide more storage volume at a lower price. From an environmental perspective, polybags are also easier to recycle than other packaging and shipping material.

Therefore, there is a need to provide a complete and efficient shielding of EMI in a robotic gripper environment, where a RFID tag of a grasped object can be isolated in order for proper scanning by a RFID reader.

BRIEF SUMMARY

In one embodiment, the disclosure relates to a system for mitigating wireless interference in a robot environment which may be summarized as including a robotic gripper configured to manipulate an object in the robot environment; a wireless reader configured to receive a signal from a tag coupled to the object over a wireless air interface formed between the reader and the tag; and a shield configured to surround at least a portion of the wireless air interface. The shield may be selectively deployable from, and retractable into, a wall that surrounds at least a portion of the robot environment. The shield may be deployable from, and retractable into, a housing coupled to the wireless reader. The wireless reader may be a radio-frequency identification (RFID) reader. The tag may be a RFID tag. The shield may have a conical shape. The shield may have a selectively variable opening that is sized based on a dimension of the object.

In one embodiment, the disclosure relates to a method of mitigating wireless interference in a robot environment which may be summarized as including detecting dimensions of a grasped object by a robotic gripper by a control system, wherein the robotic environment contains a plurality of objects having respective RFID tags; detecting a signal strength of a RFID tag coupled to the grasped object by a RFID reader; determining, by the control system if the signal strength is above a threshold value required to perform a scanning operation of the RFID tag by the RFID reader; and requiring, by the control system, a shield to be positioned around at least a portion of a wireless air interface between the RFID tag and the RFID reader, if the signal strength is not above the threshold value. The shield may be configured to block wireless interference from entering at least a portion of the wireless air interface. The shield may be removably coupled to a wall that at least partially surrounds the robot environment.

The shield may be deployable from, and retractable into, a wall that surrounds the robot environment, and may further include deploying the shield from the wall; or retracting the shield into the wall.

The method may further include selecting, by the control system, a shield that has an opening greater than a maximum dimension of the object.

The method may further include notifying an operator, by the control system, to affix a shield that has an opening greater than a maximum dimension of the object.

The method may further include deploying, by the control system, a shield that has an opening greater than a maximum dimension of the object.

In one embodiment, the disclosure relates to a method of mitigating wireless interference in a robot environment which may be summarized as including detecting, by a control system, dimensions of a grasped object by a robotic gripper, wherein the robotic environment contains a plurality of objects having RFID tags; detecting, by a RFID reader, a signal strength of a RFID tag coupled to the grasped object; determining, by the control system, if the signal strength is above a threshold value required to perform a scanning operation of the RFID tag by the RFID reader; requiring, by the control system, a shield to be placed around at least a portion of a wireless air interface between the RFID tag and the RFID reader, if the signal strength is not above the threshold value; and notifying an operator, by the control system, to affix the shield, wherein at least a portion of the shield has a diameter greater than a width of the object. The signal strength may be in the form of a Received Signal Strength Indicator (RSSI). The threshold value may be determined using a machine learning technique.

The method may further include selecting, by the control system, a shield having dimensions that are determined based on a machine learning technique. The shield may be configured to be mounted to a structure within the robot environment. The shield may be configured to be mounted proximate to the RFID reader.

BRIEF DESCRIPTION OF THE SEVERAL VIEWS OF THE DRAWINGS

These and other embodiments of the disclosure will be discussed with reference to the following exemplary and non-limiting illustrations, in which like elements are numbered similarly, and where.

DETAILED DESCRIPTION

It should be understood that aspects of the disclosure are described herein with reference to the figures, which show illustrative embodiments. The illustrative embodiments herein are not necessarily intended to show all embodiments in accordance with the disclosure, but rather are used to describe a few illustrative embodiments. Thus, aspects of the disclosure are not intended to be construed narrowly in view of the illustrative embodiments. In addition, although the disclosure is described with respect to its application for pick-and-place applications, it is understood that the systems and methods could be implemented in any setting where a robotic gripper may be useful, such as in various stages in a supply chain, assembly line, manufacturing environment, storage and warehouse facility, sorting stations, laboratory, and retail and commercial settings.

Figure 1:
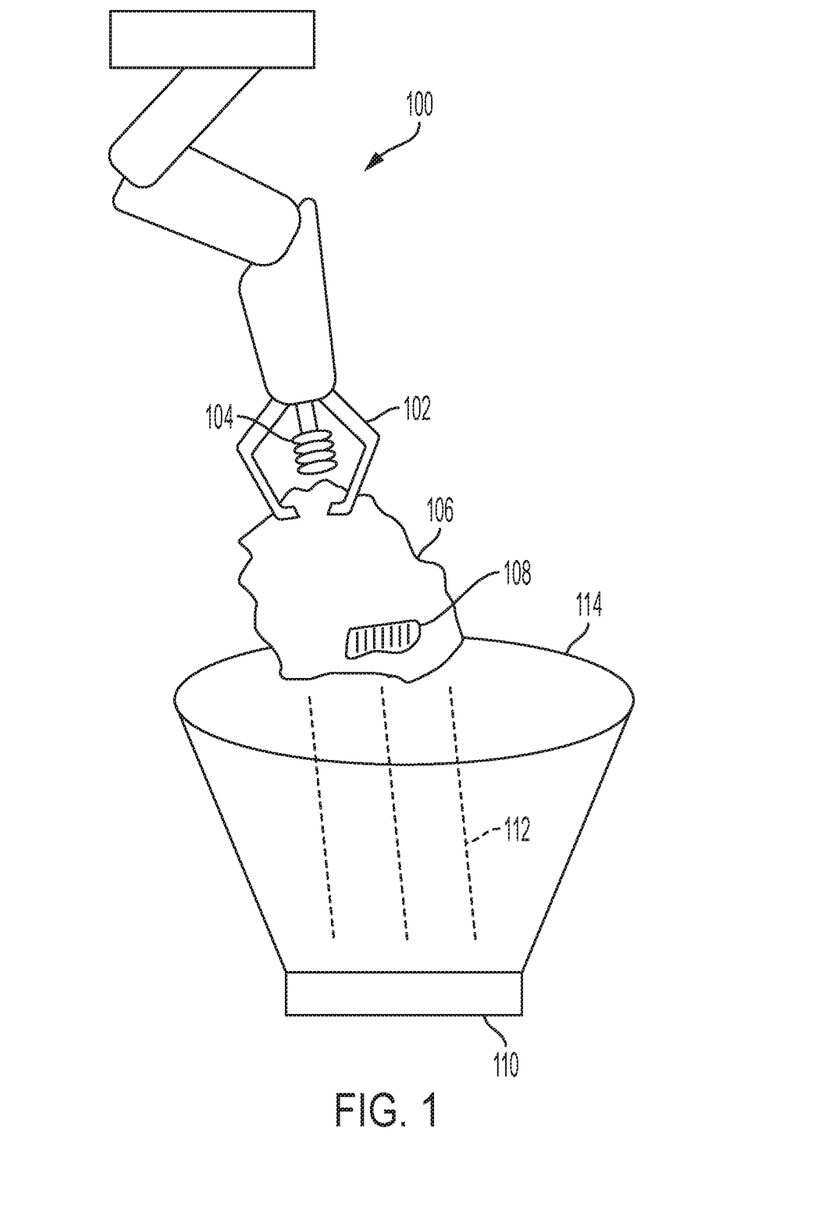
FIG. 1 is a perspective view of a robotic gripper and an EMI shield, according to an embodiment of the disclosure.

FIG. 1 is a perspective view of a robotic gripper 100 and an EMI shield 114, according to an embodiment of the disclosure. In an embodiment, the robotic gripper 100 can include gripping fingers 102, as well as a suction gripper 104. The robotic gripper 100 can have a cantilevered arm design, allowing the robotic gripper 100 to swivel and rotate about a 360 degree axis.

The gripping fingers 102 and/or the suction gripper 104 are configured to grip an object 106, such as a package, polybag, and the like. The object 106 is not limited to a package, and can include any type of object that is capable of being gripped or grasped, such as a widget, tool, article of clothing, article of manufacture, electronic component, biological materials, hazmat materials, chemicals, foodstuffs, mail and envelopes, and the like.

The object 106 includes a readable tag 108, such as a RFID tag. The tag 108 can be a read-only tag or a read-write tag, as well as a passive, active, or semi-passive tag. The tag 108 may be formed of an analog or digital circuit, for example.

In another embodiment, the tag 108 can be a chip, microchip, transponder, emitter, and the like, and the tag 108 can be ultra wide-band (UWB) real-time locating system (RTLS) tag, a WiFi RTLS tag, an infrared RTLS tag, etc. In yet another embodiment, the tag 108 can include a barcode, quick-response code, scannable printed code, GPS chipset, a near field communication (NFC) chip, etc.

The tag 108 may be coupled to the object in any suitable manner. For example, the tag 108 can be printed on the object 106, such as printed onto a polybag or packaging, can be printed onto a label or sticker having an adhesive backing affixed to the object 106, or can be printed or attached to a substrate with an adhesive backing that is affixed to the object 106.

A reader 110, such as a RFID reader or interrogator, is configured to transmit signals to and receive signals from the tag 108. The reader 110 can transmit information, via a wireless air interface 112, to the tag 108. In an embodiment, the reader 110 includes a control unit and a power supply. The wireless air interface 112 enables the reader 110 to provide power (in the event the tag 108 is a passive tag), query data and timing information to the tag 108, responsive to which the tag 108 may provide response data. Specifically, the tag 108 may scavenge power from a received radio-frequency (RF) signal, and may backscatter the response data to the reader 110 by modulating the impedance of an associated antenna. In a half-duplex communications embodiment, during a reader-to-tag transmission, the reader 110 may modulate an RF waveform with information (e.g., bits). During a tag-to-reader transmission, the reader 110 transmits a Continuous-Wave (CW) radio-frequency signal. The tag 108 then backscatter-modulates the CW signal with bits, creating a RF information waveform that is transmitted back to the reader 110.

In another embodiment, the reader 110 can include an optical imaging system to capture a visible code on the tag 108, an NFC reader, a GPS receiver, a RTLS reader, etc.

In an embodiment, an isolating structure, such as an EMI shield 114 can have a conical (e.g., frustoconical) or horn shape, as shown in FIG. 1, is positioned around a portion of, or around the entirety of, the wireless air interface 112 between the reader 110 and the tag 108. The isolating structure can be in any shape or form however, and it is not limited to the cone or horn shape described above. For example, the EMI shield 114 can have a box, rectangle, polygon, or open-ended shape, or can consist of parallel or uneven horizontal or vertical panels that are used to isolate external interference. In another embodiment, the EMI shield 114 can be a curtain or flexible panel that can be selectively extended and retracted.

The EMI shield 114 can be manufactured from solid or perforated sheet metal, metal screening, metal foam, metal wire meshing, fabrics comprising metallic fibers, or surfaces coated with metallic ink (such as, for example, a copper or nickel-based ink). The metallic material can include copper, steel and steel alloys, pre-tin plated steel, aluminum, and nickel, as well as alloys such as MuMetal®.

In another embodiment, the EMI shield 114 can be manufactured from a polymer material, such as an elastomer, silicone, or rubber. In yet another embodiment, the isolating structure can be manufactured from a magnetic material. The EMI shield can be made from any materials that block, reflect, retard, or otherwise mitigate exposure of wireless interference and wireless waves, such as EMI, radio frequency interference, electrical interference, and the like.

In an embodiment, the EMI shield 114 can be composed of separate panels, such as a right half and left half, where each panel can be independent retracted or deployed.

In an embodiment, the EMI shield 114 can be coupled to a wall of a sort station 200 (FIG. 2), or a structure location within the sort station 200, via mounting hardware, such as screws, bolts, and the like. In another embodiment, the EMI shield 114 can be coupled to the sort station 200 via magnetic coupling, hook and loop fasteners (e.g., Velcro®), adhesives, tape, and the like. In a preferred embodiment, the EMI shield 114 is mounted to the sort station 200 using hardware that can prevent movement of the EMI shield 114 in the event the EMI shield 114 comes into contact with, or is impacted by, the robotic gripper 100 or object 106.

In an embodiment, the EMI shield 114 is interchangeable such that EMI shields having different shapes, sizes, dimensions, and materials of construction can be removably secured to the sort station 200.

Figure 2:
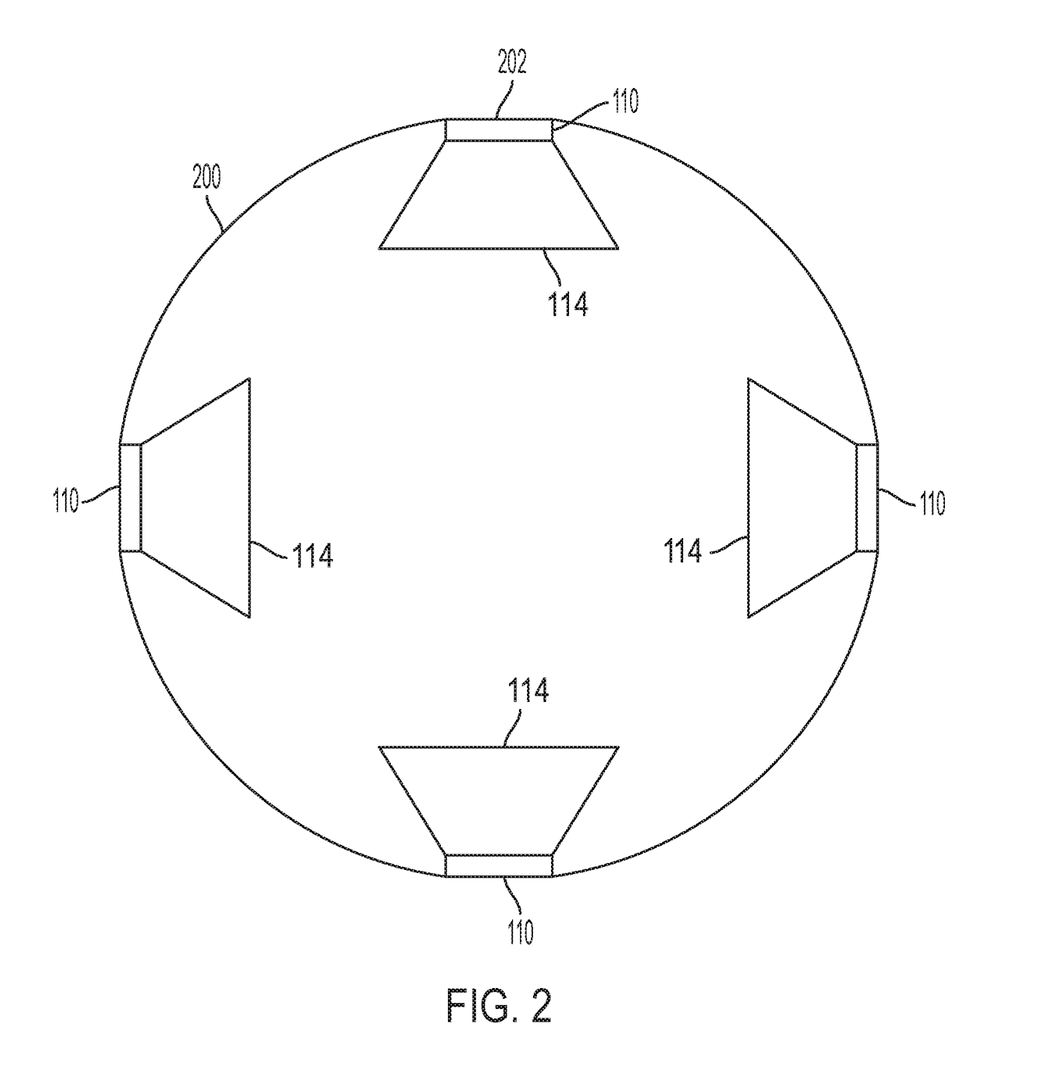
FIG. 2 is a top view of a sort station with multiple readers with EMI shields, according to an embodiment of the disclosure.

FIG. 2. is a top view of a sort station 200 with multiple readers 110 with EMI shields 114, according to an embodiment of the disclosure. In an embodiment, the environment can be within a sort station 200, where objects are disposed, stored, or otherwise placed while in transit to their next location in the supply chain process. In an embodiment, the sort station 200 can include multiple readers 110 placed at various locations on a wall 202 of the sort station 200. Each reader 110 can include an EMI shield 114.

In an embodiment, each reader 110 is spaced equidistant from the other at various locations on the wall 202 of the sort station 200. In an embodiment, each reader 110 is fixedly mounted to the sort station 200. In another embodiment, each reader 110 can be removably attached to the sort station 200. The sort station 200 can include a track or mounting structure (not shown) that allows the readers 110 to be moved around the track to various locations within the sort station 200.

In an embodiment, each reader 110 can be coupled to the sort station 200 via mounting hardware, such as screws, bolts, and the like. In another embodiment, each reader 110 can be coupled to the sort station 200 via magnetic coupling, Velcro®, adhesives, tape, and the like. In a preferred embodiment, each reader 110 is mounted to the sort station 200 using hardware that can prevent movement of the reader 110 in the event the reader 110 comes into contact with, or is impacted by, the robotic gripper 100 or object 106.

Figure 3:
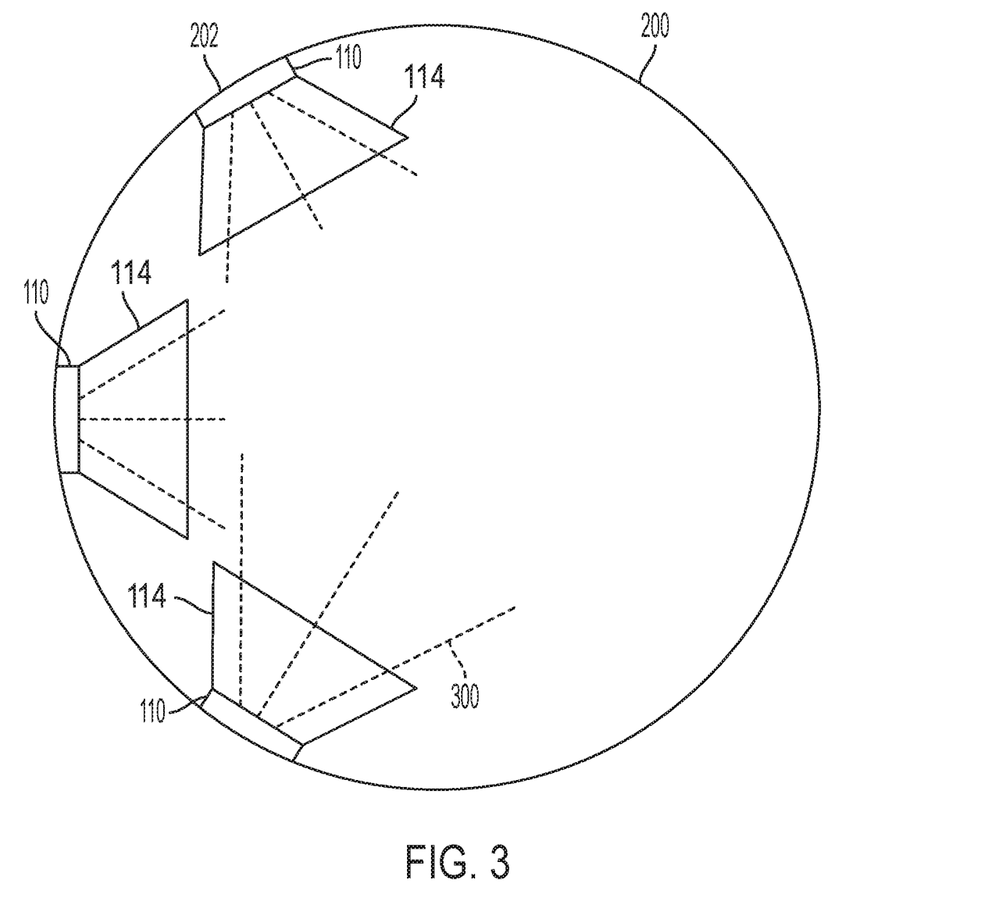
FIG. 3 is top view of a sort station with multiple readers with EMI shields placed adjacent to each other, according to an embodiment of the disclosure.

FIG. 3 is top view of a sort station 200 with multiple readers 110 with EMI shields 114 placed adjacent to each other, according to an embodiment of the disclosure. The readers 110 can be positioned, for example, adjacent to one another, in order to reduce or eliminate electromagnetic waves 300 emitted from one reader 110 causing interference at another reader. In an embodiment, the sort station 200 can further include readers 110 positioned at various locations on the wall 202 of the sort station 200. Alternatively, the sort station 200 can include a single reader 110.

Figure 4A:
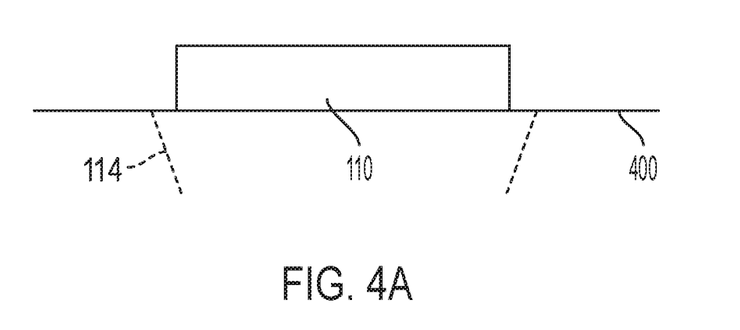
FIG. 4A is a retracted view of an EMI shield, according to an embodiment of the disclosure.

FIG. 4A is a retracted view of an EMI shield 114, according to an embodiment of the disclosure. During an initial phase of operation of the robotic gripper 100, or during initial loading or the sort station 200 with objects 106, the EMI shield 114 can be retracted in a location at least partially behind the reader 110. For example, the EMI shield 114 can be retracted into a recess 400 within the surface of the sort station 200. In another embodiment, the EMI shield 114 can be retracted into a base or housing (not shown) of the reader 110.

The EMI shield 114 can be retracted by folding or collapsing, or can be linearly retracted or extended. In another embodiment, the EMI shield 114 has a telescoping design, where multiple separate panels of the EMI shield 114 can overlap each other in a retracted position, and where the panels are extended adjacent to one another in a deployed position.

Figure 4B:
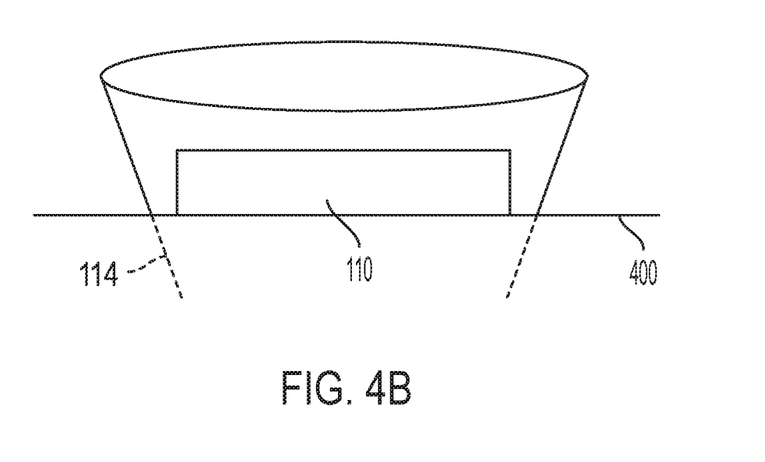
FIG. 4B is a partially deployed view of an EMI shield, according to an embodiment of the disclosure.
Figure 4C:
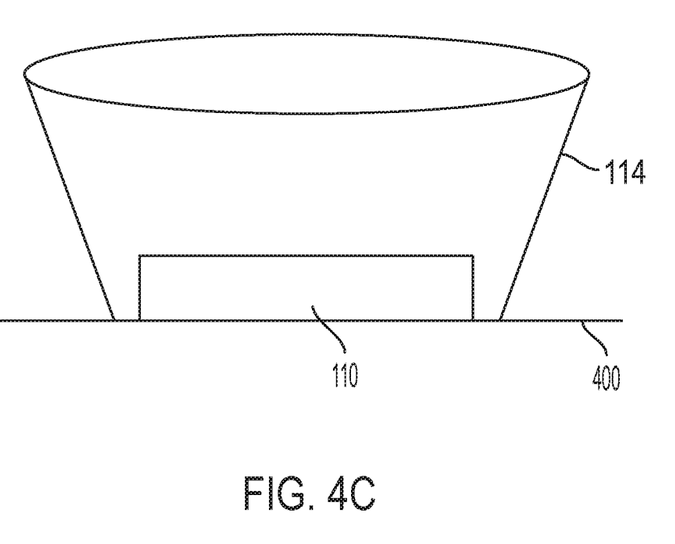
FIG. 4C is a fully deployed view of an EMI shield, according to an embodiment of the disclosure.

FIG. 4B is a partially deployed view of an EMI shield 114, according to an embodiment of the disclosure, and FIG. 4C is a fully deployed view of an EMI shield 114, according to an embodiment of the disclosure.

Figure 5:
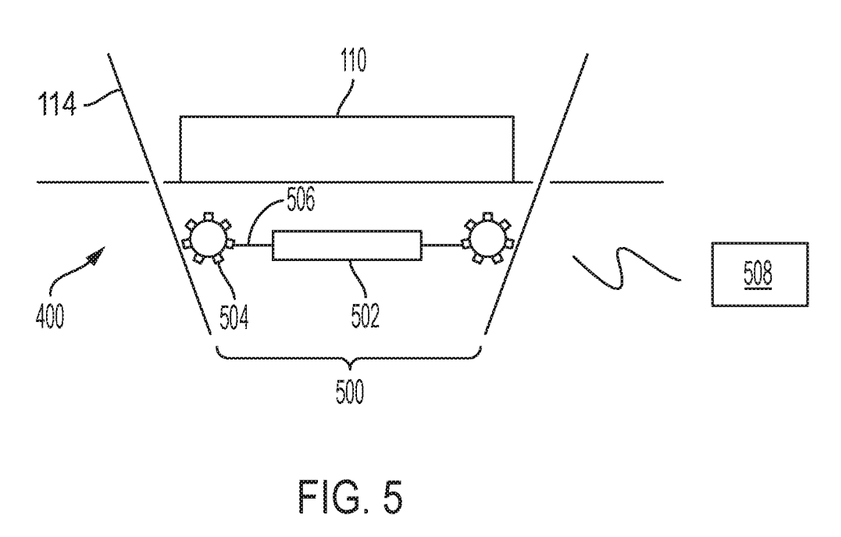
FIG. 5 is an actuating element for an EMI shield, according to an embodiment of the disclosure.

FIG. 5 is an actuating element 500 for an EMI shield 114, according to an embodiment of the disclosure. The actuating element 500 can include, for example, a drive motor 502 coupled to drive gears 504 via respective drive shafts 506. The actuating element 500 can be coupled to a local or remote control system 508 that can provide signals for deploying or retracting the EMI shield 114. The drive motor 502 can be an AC motor, hydraulic drive, eddy-current drive, rotating DC drive, an electronic drive, or other suitable drive mechanism. In addition, the actuating element 500 can include multiple drive motors, with each drive motor coupled to a respective drive gear 504.

In an embodiment, the drive gears 504 include protrusions which provide a tension or force against the EMI shield 114, allowing the EMI shield 114 to move in the position of rotation of the drive gears 504. The drive gears 504 can have a rack and pinion design, bevel gear, spiral bevel gear, worm drive, helical gear, screw gear, and the like. In another embodiment, the drive gears 504 can be rollers which apply force to the EMI shield 114. In this embodiment, the drive gears 504 can include a tacky or adhesive surface, or a surface or coating that provides improved gripping.

In an embodiment where each drive gear 504 is driven by an independent drive motor 502, the control system 508 can independently control each drive motor. By controlling only one drive motor, each side of the EMI shield 114 can be selectively positioned. For example, in the event the control system 508 determines that EMI is predominately or exclusively present on a particular side of the object 106, or a particular side of the sort station 200, then only a half, quarter, or partial portion of the EMI shield 114 is deployed, as discussed in more detail in FIG. 6.

Figure 6:
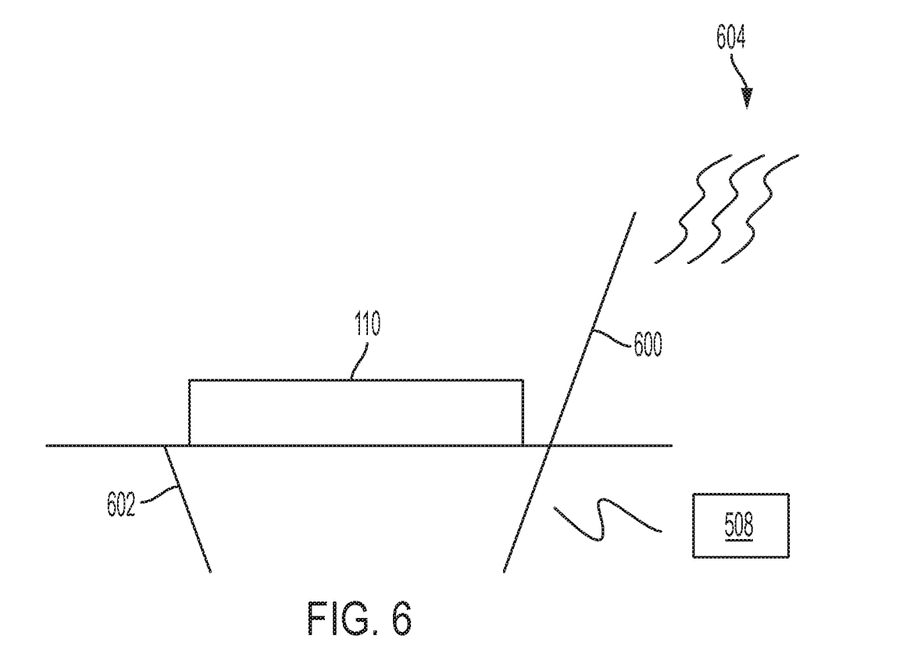
FIG. 6 is a view of one side of an EMI shield deployed, according to an embodiment of the disclosure.

FIG. 6 is a view of one side of an EMI shield 114 deployed, according to an embodiment of the disclosure. The EMI shield 114 can be composed of separate panels, such as a right half 600 and left half 602, where each panel can be independent retracted or deployed. As shown in FIG. 6, the control system 508 determines that EMI 604 is present along the right side of the reader 110. The control system 508 selectively actuates and deploys the right half 600 to mitigate the interference from the EMI 604 that may be encountered during a scan operation. Each of the one or more panels of the EMI shield 114 may be planar or non-planar in shape.

Figure 7:
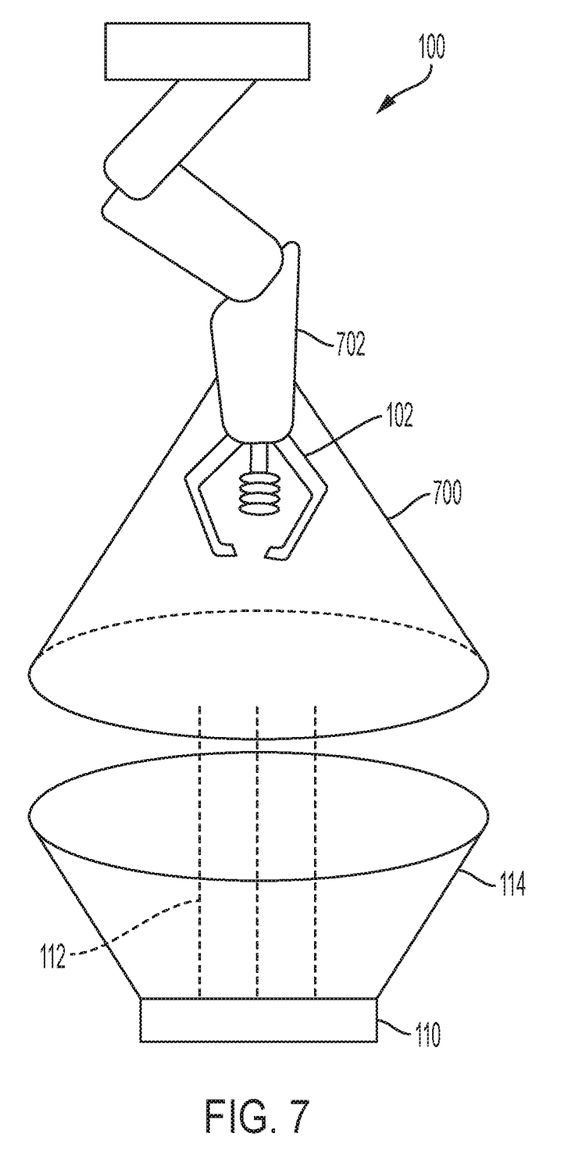
FIG. 7 is a view of an EMI shield coupled to a robotic gripper, according to an embodiment of the disclosure.

FIG. 7 is a view of an EMI shield 700 coupled to a robotic gripper 100, according to an embodiment of the disclosure. An EMI shield 700 can be affixed to the robotic gripper 100, either fixedly or removably. In another embodiment, the EMI shield 700 can be retractable into, and deployable from, a housing portion 702 of the robotic gripper 100. The control system 508 can control deployment of the EMI shield 700 as well as the EMI shield 114 coupled to a corresponding reader 110. In this fashion, the EMI shield 700 and EMI shield 114 can be positioned to be in close proximity with each other, creating a surrounded and protected wireless air interface 112 that is free from EMI (e.g., EMI from other readers or tags).

In an embodiment, the control system 508 can selectively deploy either the EMI shield 700 or the EMI shield 114. In another embodiment, the EMI shield 700 is only deployed after an object 106 has been grasped by the gripping fingers 102 and/or suction gripper 104.

Figure 8:
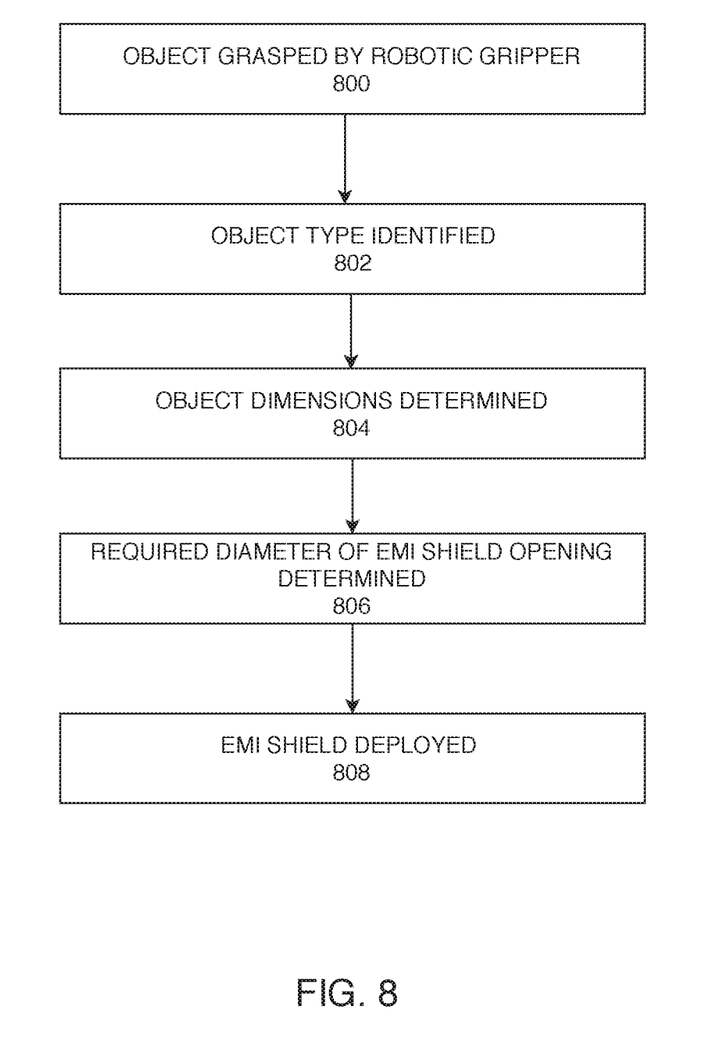
FIG. 8 is a flow diagram depicting the steps to deploy an EMI shield, according to an embodiment of the disclosure.

FIG. 8 is a flow diagram depicting the steps to deploy an EMI shield 114, according to an embodiment of the disclosure. In step 800, an object 106 is grasped by the robotic gripper 100. In step 802, the control system 508 can identify the object 106 using, for example images or video captured from a camera or cameras which are located in the environment of the sort station 200, and/or which are coupled to the robotic gripper 100. The control system 508 can utilize object recognition techniques to analyze the image or video data to determine the object type being grasped by the robotic gripper 100. In an embodiment, learned historical data, such as from a machine learning, reinforcement learning, or the like, can be utilized as part of the object recognition process.

In step 804, after the object 106 has been identified, the control system 508 determines the dimensions of the object 106, as well as a required clearance between the gripping fingers 102, the object 106, and the EMI shield 114. As an example, if the object 106 has a length of 6 inches, the control system 508 in step 806 determines that the EMI shield 114 is required to have a specific clearance, of, for example, 1 inch around each side beyond the length of the object 106 and robotic gripper 100, thus requiring an EMI shield 114 having at least an 8 inch opening to accommodate the robotic gripper 100 and grasped object 106. In an embodiment, the opening can be measured from two opposing points on opposite distal sides or curves which form the EMI shield 114, where the measurement is along a hypothetical line that intersects a central point of the opening.

In an embodiment, the EMI shield 114 is required to, at a minimum, have an opening having a diameter greater than, or equal to, a maximum dimension of the object 106. In another embodiment, the EMI shield 114 is required to, at a minimum, have an opening that is equal to or greater than a maximum dimension of the object 106. In an embodiment, the opening can be measured from two opposing points on opposite distal sides or curves which form the EMI shield 114, where the measurement is along a hypothetical line that intersects a central point of the opening.

In an embodiment, the opening of the EMI shield 114 can be selectively varied based on the dimensions of the object.

The clearance value can be pre-determined, or alternatively, can be dynamically selected by the control system 508 based on characteristics of the object 106. For example, if the object 106 is a rigid and hard, a larger clearance of, for example, 5 inches on each side, may be required to mitigate the risk of inadvertent collision with the EMI shield 114.

If the object 106 is soft or flexible, or has properties such that is the object 106 is unlikely to damage or dislodge the EMI shield 114, then the control system 508 can select a smaller clearance value.

The determined and selected clearance values by the control system 508 can be stored over time, and utilized by a machine learning system. In addition, collision and damage data corresponding to the selected clearance values and object types can be stored over time as well. The machine learning system can use this stored data to determine an optimal clearance value for each object type, and the control system 508 can leverage the machine learning system to efficiently select a clearance value.

For example, the control system 508 may initially determine that an object 106 that is soft and flexible requires a relatively small clearance. However, over time, this particular type of object may become lodged within the EMI shield 114 during a scanning operating, causing strain on the robotic gripper 100. The machine learning system can determine that due to this lodging, the optimal clearance for this particular type of object should be increased.

Next in step 808, the control system 508 deploys the EMI shield 114 by actuating the drive gears 504. In an embodiment, the control system 508 utilizes a feedback loop to determine when the EMI shield 114 has been retracted to the required diameter.

In another embodiment, the sort station 200 can include multiple readers 110, each having a different sized EMI shield 114. In this embodiment, in step 808, instead of deploying an EMI shield 114, the control system 508 determines which EMI shield has a diameter than can accommodate the grasped object 106, and controls the robotic gripper 100 to maneuver the object 106 toward that particular EMI shield and reader.

In another embodiment, the multiple readers 110 can be mounted on a movable track that is controlled by the control system 508. Instead of solely maneuvering the object 106 by the robotic gripper 100 towards a particular EMI shield, the particular EMI shield and reader can simultaneously be positioned by movement of the track, thus decreasing the scanning time by moving the object 106 closer to the reader 110 by repositioning the object 106 as well as the reader 110.

In another embodiment, the control system 508 can selectively reposition only the object 106, or only the reader 110.

In yet another embodiment, the control system 508 can instruct an operator, human technician, or another robotic system to mount a properly sized EMI shield around the wireless air interface. In this embodiment, the EMI shield is not retractable into or deployable from the sort station 200, reader 110, or robotic gripper 100, and is manually attached and detached as needed based on an instruction or notification from the control system 508.

Figure 9:
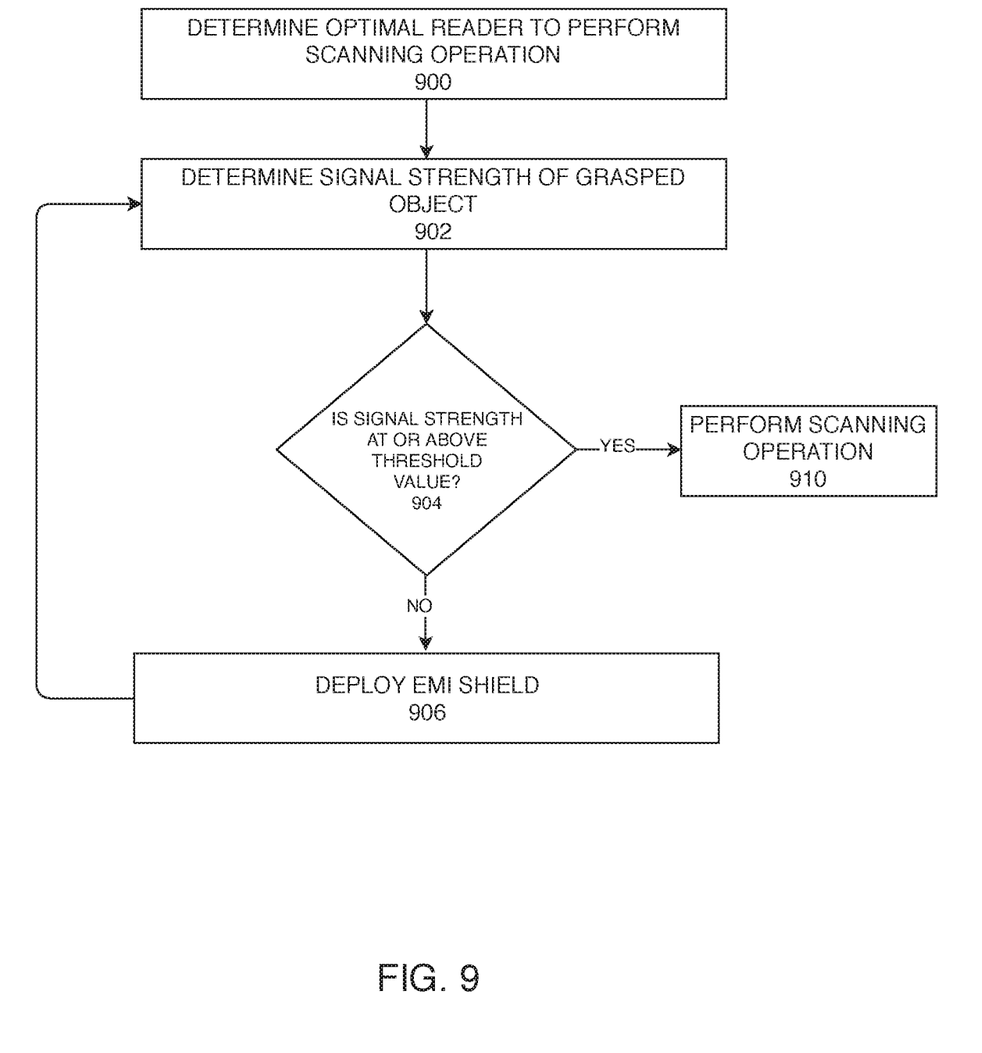
FIG. 9 is a flow diagram depicting the steps to perform a scan operation, according to an embodiment of the disclosure.

FIG. 9 is a flow diagram depicting the steps to perform a scan operation, according to an embodiment of the disclosure. In step 900, the control system 508 determines an optimal reader 110 for a scanning operation. The optimal reader 110 can be determined based on the position of the reader relative to the object 106 and/or the robotic gripper 100, as well as the required travel time to maneuver the reader 110 and/or object 106 into a scanning position where the object 106 is within the wireless air interface 112. The control system 508 can utilize machine learning to determine, based on stored data related to object types, positioning times, and scanning success and failure data, in order to select the optimal reader 110.

In step 902, the control system 508 determines the signal strength being emitted from the tag 108 on the grasped object 106. In an embodiment, the reader 110 sends an interrogation signal to the tag 108, which responds in turn via backscatter. The reader 110 analyzes the response and reports an estimated measure of power that is being received from the tag 108. For example, the measure of power can be in the form of a Received Signal Strength Indicator (RSSI).

In step 904, the control system 508 determines if the signal strength is at or above a minimum threshold in order to successful perform a scan operation of the tag 108 by the reader 110. The threshold value can be based on, for example, machine learning that utilizes signal strength values, object types, and object to reader distances, and/or scanning success and failure data, over time, to determine an optimal or minimum required signal strength threshold value.

If the control system 508 determines that the signal strength is not at a threshold value, then in step 906, the EMI shield 114 for that particular reader 110 is deployed. The process returns to step 902 to determine the signal strength of the tag 108. At this point, the EMI shield 114 may provide protection from EMI, resulting in an increased signal strength. The process returns to step 904 as discussed above.

If the control system 508 determines that the signal strength is at a threshold value, then in step 908, the reader 110 performs a scan operation on the tag 108.

In another embodiment, in addition to, or instead of, determining the signal strength emitted from the tag 108 in step 902, the control system 508 can utilize an EMI detector, or a series of EMI detectors, to determine the level of EMI in the sort station 200. If the EMI level in the sort station 200 is above a threshold value, then the process can continue to step 906 where the EMI shield 114 is deployed.

In yet another embodiment, the control system 508 can automatically deploy the EMI shield 114 based on a sensed collective weight of objects within the sort station 200, or based on an object count within the sort station 200. For example, the sort station 200 can further include a transducer, scale, load cell, and/or strain gauge to detect the weight within the sort station 200. If the weight is above a threshold value, the control system 508 assumes that there is a high number of objects within the sort station, with each object having a tag that emits potential EMI. In this scenario, the process continues to step 906, where the EMI shield 114 is deployed.

While the principles of the disclosure have been illustrated in relation to the exemplary embodiments shown herein, the principles of the disclosure are not limited thereto and include any modification, variation or permutation thereof.

What is claimed is:

1. A system for mitigating wireless interference in a robot environment, comprising:
   a robotic gripper configured to manipulate an object in the robot environment;
   a wireless reader configured to receive a signal from a tag coupled to the object over a wireless air interface between the wireless reader and the tag; and
   a shield configured to surround at least a portion of the wireless air interface, wherein the shield has a selectively variable opening that is sized based on a dimension of the object.

2. The system of claim 1, wherein the shield is selectively deployable from, and retractable into, a wall that surrounds at least a portion of the robot environment.

3. The system of claim 1, wherein the shield is deployable from, and retractable into, a housing coupled to the wireless reader.

4. The system of claim 1, wherein the wireless reader is a radio-frequency identification (RFID) reader.

5. The system of claim 1, wherein the tag is a RFID tag.

6. The system of claim 1, wherein the shield has a conical shape.

7. A method of mitigating wireless interference in a robot environment, comprising:
   detecting dimensions of a grasped object by a robotic gripper by a control system, wherein the robotic environment contains a plurality of objects having respective RFID tags;
   detecting a signal strength of a RFID tag coupled to the grasped object by a RFID reader;
   determining, by the control system if the signal strength is above a threshold value required to perform a scanning operation of the RFID tag by the RFID reader; and
   requiring, by the control system, a shield to be positioned around at least a portion of a wireless air interface between the RFID tag and the RFID reader, if the signal strength is not above the threshold value.

8. The method of claim 7, wherein the shield is configured to block wireless interference from entering at least a portion of the wireless air interface.

9. The method of claim 7, wherein the shield is removably coupled to a wall that at least partially surrounds the robot environment.

10. The method of claim 7, wherein the shield is deployable from, and retractable into, a wall that surrounds the robot environment, and the method further comprises:
    deploying the shield from the wall; or
    retracting the shield into the wall.

11. The method of claim 7, further comprising selecting, by the control system, a shield that has an opening greater than a maximum dimension of the object.

12. The method of claim 7, further comprising notifying an operator, by the control system, to affix a shield that has an opening greater than a maximum dimension of the object.

13. The method of claim 7, further comprising, deploying, by the control system, a shield that has an opening greater than a maximum dimension of the object.

14. A method of mitigating wireless interference in a robot environment, comprising:
    detecting, by a control system, dimensions of a grasped object by a robotic gripper, wherein the robotic environment contains a plurality of objects having RFID tags;
    detecting, by a RFID reader, a signal strength of a RFID tag coupled to the grasped object;
    determining, by the control system, if the signal strength is above a threshold value required to perform a scanning operation of the RFID tag by the RFID reader;
    requiring, by the control system, a shield to be placed around at least a portion of a wireless air interface between the RFID tag and the RFID reader, if the signal strength is not above the threshold value; and
    notifying an operator, by the control system, to affix the shield, wherein at least a portion of the shield has a diameter greater than a width of the object.

15. The method of claim 14, wherein the signal strength is in the form of a Received Signal Strength Indicator (RSSI).

16. The method of claim 14, wherein the threshold value is determined using a machine learning technique.

17. The method of claim 14, further comprising selecting, by the control system, a shield having dimensions that are determined based on a machine learning technique.

18. The method of claim 14, wherein the shield is configured to be mounted to a structure within the robot environment.

19. The method of claim 14, wherein the shield is configured to be mounted proximate to the RFID reader.

\* \* \* \* \*